(12) United States Patent
Goebert

(10) Patent No.: US 6,447,152 B1
(45) Date of Patent: Sep. 10, 2002

(54) WIDE-ANGLE HEADLIGHTING AND SIDELIGHTING ASSEMBLY

(75) Inventor: Barry Joseph Goebert, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/577,098

(22) Filed: May 24, 2000

(51) Int. Cl.$^7$ .............................. B60Q 1/44; F21V 19/00
(52) U.S. Cl. ........................................ 362/485; 362/516
(58) Field of Search .................................. 362/485, 543, 362/516, 517, 518, 496, 241, 247, 538, 487

(56) References Cited

U.S. PATENT DOCUMENTS

| | | | |
|---|---|---|---|
| 4,622,626 A | * 11/1986 | Sassmannshausen | 362/305 |
| 4,758,932 A | * 7/1988 | Coons | 362/546 |
| 5,047,906 A | 9/1991 | Weber | 362/80 |
| 5,351,171 A | 9/1994 | Bushey | 362/80 |
| 5,428,512 A | 6/1995 | Mouzas | 362/80 |
| 5,479,323 A | 12/1995 | Shibata et al. | 362/71 |
| D371,372 S | 7/1996 | Westimayer et al. | D15/31 |
| 5,668,663 A | * 9/1997 | Varaprasad et al. | 359/608 |
| 5,758,944 A | 6/1998 | Jandron | 362/80 |
| 5,782,312 A | * 7/1998 | Murakawa | 180/69.2 |
| D411,330 S | 6/1999 | Goebert et al. | D26/139 |
| 5,966,073 A | 10/1999 | Walton | 340/479 |
| D421,266 S | 2/2000 | Hinklin | D15/15 |

OTHER PUBLICATIONS

Published and authored by Deere and Co., "John Deere 6602 Combine Operator's Manual", cover and p. 15, date of publication unknown but presumed 1979 or earlier published in U.S.A.
John Deere Hillside Combine brochure, cover & pp. 12–13, published 1977 in U.S.A.
Published and authored by Deere and Co., "John Deere 6602 Hillside Combine" brochure, cover and pp. 12–13, published in 1977 in U.S.A.

* cited by examiner

Primary Examiner—Sandra O'Shea
Assistant Examiner—Bao Truong

(57) ABSTRACT

A headlight and sidelight assembly is provided for an off-road vehicle having a front enclosure. The front enclosure has a front end face lying substantially in a plane disposed substantially perpendicular to a longitudinal axis of the vehicle and first and second side faces. First and second light housings are disposed at the intersection of the end face and opposite side faces and are each open toward a side and front of the vehicle. First and second reflectors are provided in the housings and form divergent inner walls of the housings. Light emitting elements are disposed in the housings in front of the reflectors, each projecting a beam pattern of light intersecting the longitudinal centerline of the vehicle and extending outward and rearward therefrom past a line transverse to the longitudinal centerline of the vehicle and extending through a rearward end of the light housing, so that the first and second light-emitting elements together effectively illuminate an area greater than 180° about the front of the vehicle.

16 Claims, 3 Drawing Sheets

WIDE-ANGLE HEADLIGHTING AND SIDELIGHTING ASSEMBLY

BACKGROUND OF THE INVENTION

1. Field of the Invention

The present invention relates to vehicle lighting systems and more particularly to a headlighting and sidelighting assembly for an off-road vehicle.

2. Description of Related Art

Headlights for vehicles are known in various configurations. The conventional headlights typically include a housing, as well as a reflector, a lens, and a light source located between the reflector and the lens. Vehicles of various types, including automobiles and some conventional lawn tractors, have headlamps for producing light forward of the vehicle at night. The direction of illumination of the headlamps is typically fixed so that the main beam of light is applied directly forward of the vehicle. However, when the vehicle is traveling along a curve, the headlamps may not be able to sufficiently illuminate objects ahead of the vehicle. In other words, during travel along curves and in cornering, hazardous objects located in the path of the vehicle may not sufficiently be illuminated by the headlamps.

In addition, the need for cornering illumination may be amplified in the case of vehicles which do not have the cornering characteristics of a conventional automobile. For instance, where the vehicle is capable about a spin turn about its rear axle, even greater need exists for extending a beam of light to the side or rear of the vehicle to provide sufficient illumination. Vehicles such as lawn and garden tractors carrying vegetation cutting decks present a further dilemma in that the deck often extends beyond sides of tractor so that illuminating the path of the deck may require a wider and more rearwardly directed beam than required for illumination of the tractor path.

In an attempt to provide better lighting for operating a vehicle along curves and in cornering, vehicle cornering headlamp systems (such as that taught by U.S. Pat. No. 5,479,323 issued to Shibata et al.) have been developed in which the direction of illumination of the headlights is varied in association with a steering wheel turning operation so that objects located in the actual path of the vehicle are illuminated. In addition, sidelighting arrangements, such as that disclosed in U.S. Pat. No. 5,428,512 issued to Mouzas, are known to provide auxiliary lighting to the side of a vehicle under certain conditions. Also, some off-road vehicles, such as combines, have been provided with lighting systems for nighttime operation which include multiple floodlights disposed about the front and sides of vehicle. Each of these conventional lighting arrangements, however, represents substantial additional expense and is unduly taxing on the vehicle's electrical system.

SUMMARY OF THE INVENTION

The present invention is an improved headlight assembly for projecting illumination to the front and sides of an off-road vehicle. The headlight assembly takes the form of a pair of light housings at opposite sides of the front of a vehicle, each open toward the side and front of the vehicle. Each housing holds a light-emitting element and a reflector. The reflector forms divergent inner walls of the light housing, a first wall extending forwardly and inwardly (toward the longitudinal centerline of the tractor) and a second wall extending rearwardly and outwardly. The elements and reflectors on each side cooperate produce beams which overlap at the longitudinal centerline of the vehicle and extend rearward to effectively illuminate an area greater than 180° about the front of the vehicle.

DETAILED DESCRIPTION OF THE PREFERRED EMBODIMENT

Figure 1:
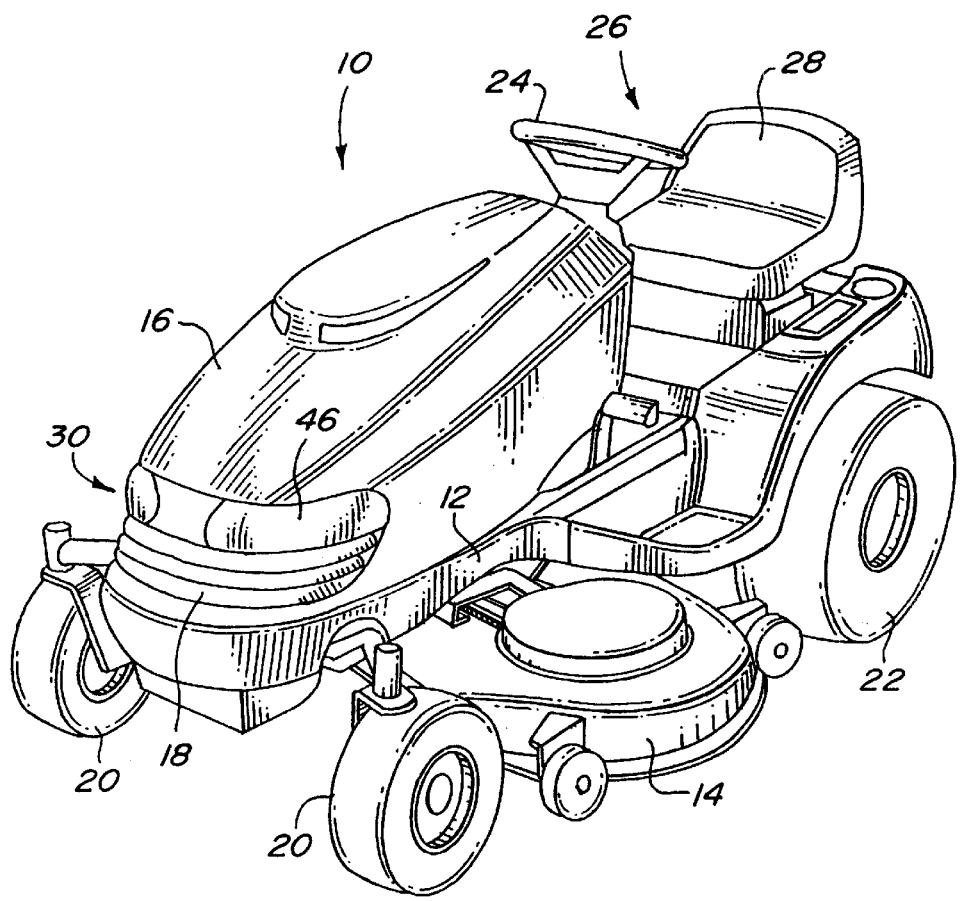
FIG. 1 is an elevated front left perspective view of a lawn and garden tractor having headlight and sidelight assembly according to a preferred embodiment of the present invention.

Referring now to the drawings, there is shown the preferred embodiment of the present invention. FIG. 1 illustrates a lawn and garden tractor vehicle 10 having a frame 12 beneath which is positioned a mower deck 14. A power source or engine (not shown) is carried beneath a hood formed as a unitary front enclosure 16 at the front of the vehicle 10. The front enclosure 16 includes a grille surface 18 which extends across a front end face of the enclosure and wraps around to the side faces of the enclosure. The engine is operatively coupled with the mower deck 14 for transmitting rotational power to mower blades within the mower deck 14. The mower blades rotate within the mower deck 14 to cut grass as the vehicle 10 travels across the ground. The vehicle 10 includes a front pair of caster wheels 20 that engage the ground and pivot as the vehicle 10 executes a turn. The vehicle 10 includes a rear pair of ground engaging wheels 22 that are operatively driven by the engine 16 for propelling the vehicle 10 across the ground. The operator can manipulate a steering wheel 24 to cause the rear wheels 22 to rotate at different speeds to thereby cause the vehicle 10 to execute turns of varying degree, including a spin turn wherein the wheels 22 are driven at equal speeds in opposite directions so that the vehicle 10 spins about its rear axle.

An operator station 26 is provided which includes a seat 28 upon which an operator sits during vehicle travel. A plurality of controls are positioned in the operator station 26 and are engageable by the operator for controlling the operation of the vehicle 10, including the steering wheel 24 which can be manipulated by the operator for causing the vehicle 10 to execute turns. In addition, foot pedals 29 are provided (shown in FIG. 2) and can be depressed by the operator for driving the vehicle 10 forwardly and rearwardly at varying speeds.

At the front of the vehicle 10, a headlight and sidelight assembly 30 is provided which includes a light housing 32, a reflector 34 and a light emitting element such as an incandescent bulb 36. A light housing 32 is molded as part of the front enclosure 16 at each side of the grille surface 18. The light housings 32 are mirror images of each other about a longitudinal centerline 38 of the vehicle 10. Each housing 32 is open to the front and rear of the vehicle 10 and includes a mounting surface 40 from which divergent inner walls 42,44 extend. The laterally outboard wall 42 of each housing 32 extends forwardly and inwardly (toward the longitudinal centerline 38 of the vehicle 10) and the laterally inboard wall 44 extends rearwardly and outwardly. Translucent lenses 46 are provided at the openings of the housing 32 so that the lenses 46 also wrap around from the front end face of the vehicle 10 to the sides. Although the lenses 46 may be constructed with various light diffusion characteristics, the lenses 46 are not critical to achieving desirable dispersion of light in the preferred embodiment. They are, however, useful for protecting the bulb 36.

Figure 2:
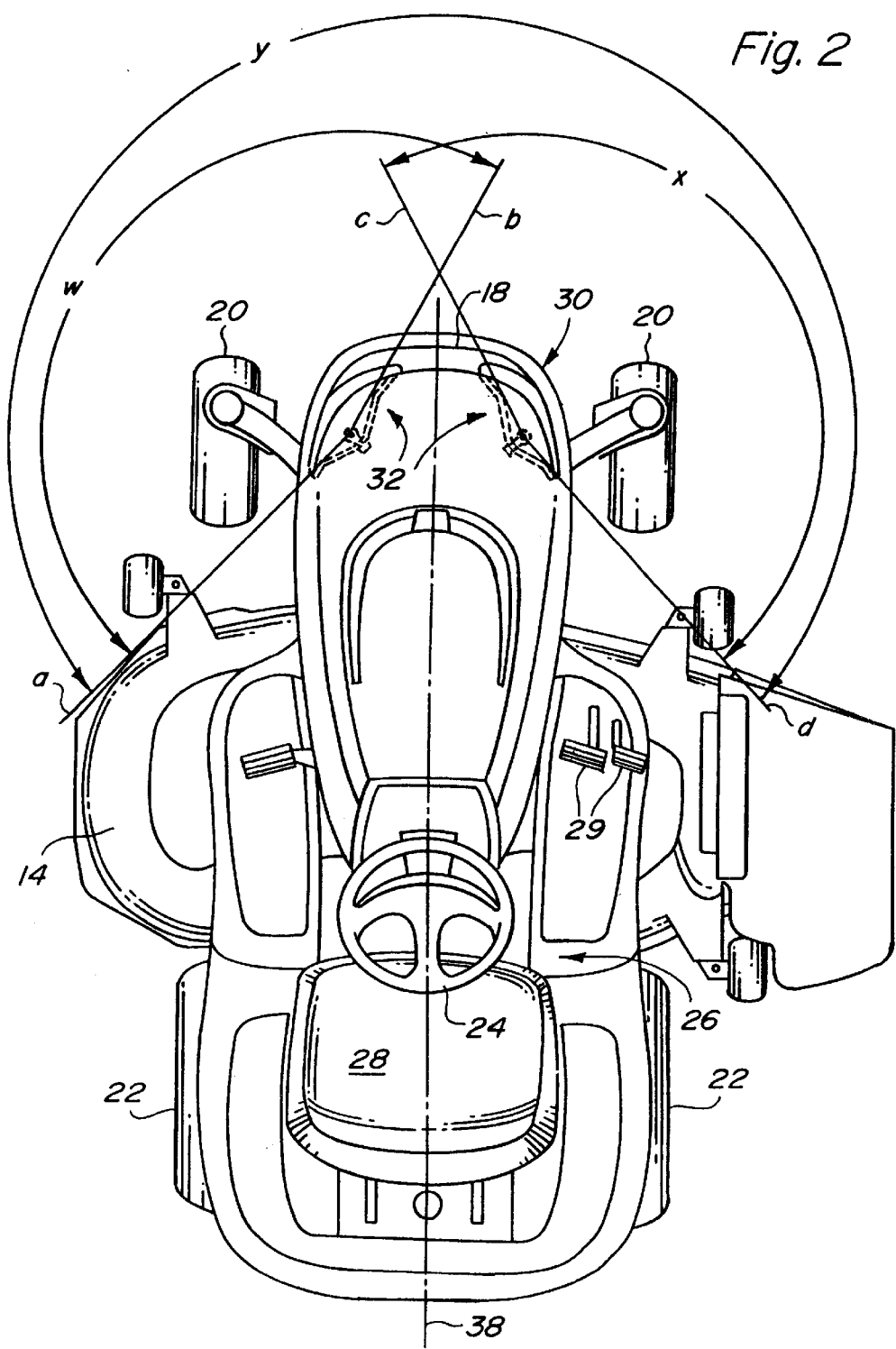
FIG. 2 is a plan view of the lawn and garden tractor of FIG. 1 wherein the details of the headlight and sidelight assembly are shown in hidden lines.
Figure 3:
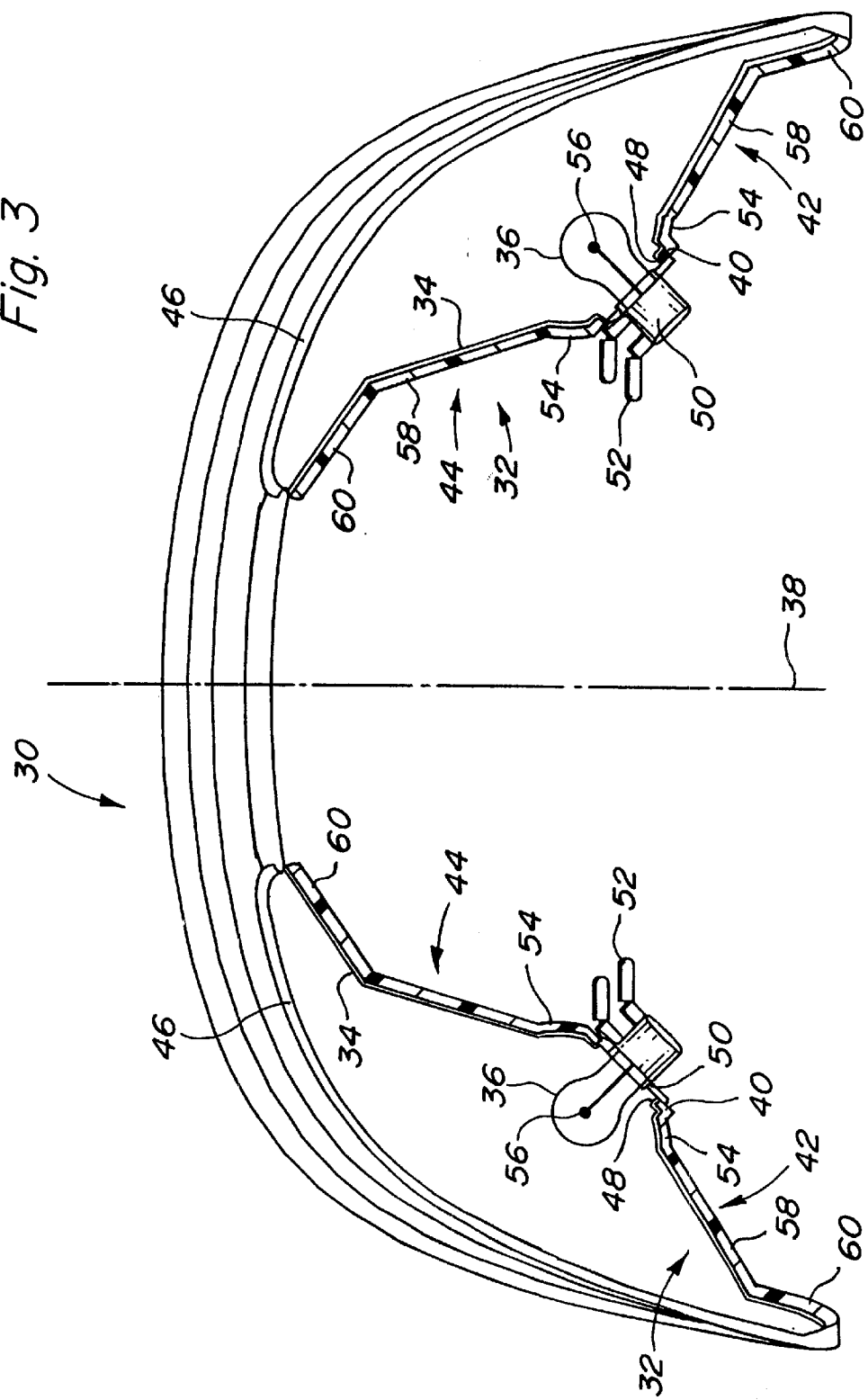
FIG. 3 is an enlarged horizontal cross-sectional view taken through the front enclosure of the lawn and garden tractor showing in greater detail the headlight and sidelight assembly of FIG. 2.

The mounting surface 40 of each of the light housings 32 is shown in FIG. 3 as a generally planar vertical portion of the housing 32 having a hole 48 for receiving a light socket 50. The socket 50 receives the bulb 36 so that the bulb 36 may be positioned in front of (distally with respect to) the reflector 34, between the reflector 34 and the translucent lens 46. The socket 50 includes a wiring harness 52 for connecting the bulb 36 to a power supply and, for example, an on/off switch, if desired. The mounting surface 40 is shown perpendicular to a line 45° from the longitudinal centerline 38 of the vehicle so that the bulb 36, when mounted, will be directed along the 45° line. The bulb 36 is shown including a single filament 56. Although a single-filament bulb is shown in FIG. 2, those skilled in the art will appreciate that many conventional light-emitting elements may be used, including bulbs with multiple filaments. If a bulb 36 having a single filament 56 is used as shown in FIGS. 2–3, the filament 56 is preferably oriented vertically (into the page as viewed in FIG. 3) for optimal direct and reflected light distribution as light will radiate outwardly from the filament 56.

In the preferred embodiment, the inner walls 42, 44 are formed as part of the light housings 32 integrally with the grille surface 18 of the front enclosure 16 and the reflector 34 effectively covers the inner walls 42, 44 of each of the housings 32 to determine the pattern of light reflected from the bulb 36. The reflector 34 may take the form of a film such as a reflective mylar which is fixed to the walls (by adhesive, for example) to form a reflective surface on the inner walls 42, 44 to the exterior of the housing 32. Alternatively, the reflector 34 could be fashioned of a more rigid material so that inner walls of the housing 32 might consist solely of a reflector and the geometry of an inner surface of the reflector could be constructed according to the geometry of the inner walls 42, 44 herein described. In the preferred embodiment shown, the reflector 34 will substantially assume the geometry of the inner walls 42, 44 to which it is affixed.

The inner walls 42, 44 diverge from the mounting surface 40 and include curved portions 54 proximal to the mounting surface 40. The curved portions 54 may be used to direct a greater portion of reflected light to a targeted area (e.g., directly in front of the tractor), than would be achieved by an even dispersal of light by the reflector 34. If such a curved portion 54 is used, it may be desirable to make such portion parabolic in plan or paraboloidal with the filament 56 of the bulb 36 placed at the focus so that light from the filament 56 is reflected off of the particular portion of the inner walls 42, 44 in parallel rays toward a targeted area. Moving further from the mounting surface 40, the inner walls 42, 44 transition to flat portion 58 and then to a further outwardly turned portion 60 which may be utilized, for example, if available space within the front enclosure 16 constrains ability to create a greater angle of divergence along the entire extent of inner walls 42, 44 so that a wider beam of light may be provided. In addition, where the lenses 46 extend beyond the point where the flat portions 58, if extended, would intersect the lenses 46, the outwardly turned portions 60 provide an aesthetically pleasing, muted light rather than a harsh line of light indicating the extents of the housing 32 behind the lens 46.

Looking to FIG. 2, the beam pattern of light produced by the headlight and sidelight assembly 30 is shown. The left-side portion of the assembly (the left headlight) produces a beam of light in arc of angle w extending from reference line a (a line from the filament 56 of the bulb 36 toward the centerline 38 of the vehicle 10 in the most direct line achievable without interference from the inner wall 44 of the housing 32) to reference line b (a line from the filament 56 of the bulb 36 toward the side and rear of the vehicle 10 in the most direct line achievable without interference from the inner wall 42 of the housing 32), and the right-side portion (the right headlight) of the assembly 30 produces a beam of light which is a mirror image of the beam projected by the left-side portion about the longitudinal centerline 38 of the vehicle 10, in arc of angle x extending from reference line c (a line from the filament 56 of the bulb 36 toward the centerline 38 of the vehicle 10 in the most direct line achievable without interference from the inner wall 44 of the housing 32) to reference line d (a line from the filament 56 of the bulb 36 toward the side and rear of the vehicle 10 in the most direct line achievable without interference from the inner wall 42 of the housing 32). The respective beams of the left and right-side headlights overlap at the centerline 38 of the vehicle 10, so that together the headlight assembly 30 effectively illuminates an arc around the front of the vehicle 10 from reference line a to reference line d in an arc of angle y. In the embodiment shown in FIG. 2, the angle y is approximately 270°, providing light around the front of the vehicle 10 to the front edges of the vegetation cutting deck 14.

One skilled in the art will appreciate that the present invention can be practiced by other than the described embodiments, which are presented for purposes of illustration and not limitation, and the present invention should be limited only by the claims that follow.

We claim:

1. A headlight assembly for projecting illumination to the front and sides of an off-road vehicle having a front enclosure, the front enclosure having a front end face lying substantially in a plane disposed substantially perpendicular to a longitudinal axis of the vehicle and having first and second side faces, each of said first and second side faces lying substantially in a plane disposed substantially parallel to the longitudinal centerline of the vehicle, said headlight assembly comprising:

a first light housing disposed at the intersection of the end face and one of the first and second side faces and at least partially open toward a first side and front of the vehicle;

a second light housing disposed at the intersection of the end face and the other of the first and second side faces and at least partially open toward a second side and front of the vehicle;

a first reflector disposed within the first light housing and forming first and second divergent inner walls of the first light housing, each of the inner walls being substantially free of openings therein so as to form an unbroken surface from which light may be directed, the first wall extending towards the longitudinal centerline of the vehicle and the second wall extending away from the longitudinal centerline of the vehicle, each of the inner walls including a curved portion, the curved portion transitioning to a substantially non-curved portion;

a second reflector disposed within the second light housing and forming first and second divergent inner walls of the second light housing, each of the inner walls being substantially free of openings therein so as to form an unbroken surface from which light may be directed, the first wall extending towards the longitudinal centerline of the vehicle and the second wall extending away from the longitudinal centerline of the vehicle, each of the inner walls including a curved portion adjacent the light-emitting element, the curved portion transitioning to a substantially non-curved portion;

a first light-emitting element disposed in the housing in front of the first reflector, the curved portion of the first reflector being disposed adjacent the first light-emitting element; and a second light-emitting element disposed in the housing in front of the second reflector, the curved portion of the second reflector being disposed adjacent the second light-emitting element;

each of said first and second light-emitting elements and a respective one of the first and second reflectors cooperating to establish a beam pattern of light to be projected therefrom, said beam pattern intersecting the longitudinal centerline of the vehicle and extending outward and rearward therefrom past a line transverse to the longitudinal centerline of the vehicle and extending through a rearward end of the light housing, the first and second light-emitting elements together effectively illuminating an area greater than 180° about the front of the vehicle.

2. The headlight assembly of claim 1 additionally comprising first and second translucent lenses covering at least in part the first and second light housings, said first and second light-emitting elements each disposed between one of the first and second reflectors and one of the first and second translucent lenses.

3. The headlight assembly of claim 1 wherein the light-emitting element is directed at an angle of 45° from the longitudinal centerline of the vehicle.

4. The headlight assembly of claim 1 wherein the light-emitting element is configured as a bulb having a filament oriented generally vertically.

5. The headlight assembly of claim 1 wherein the front enclosure includes a grille portion at the front end face thereof and the first and second light housings are integrally molded in the grille portion of the front enclosure.

6. The headlight assembly of claim 5 wherein the reflector is comprised of a reflective mylar film affixed to an inner surface of the light housing.

7. The headlight assembly of claim 1 wherein the vehicle includes a vegetation cutting deck mounted between front and rear sets of wheels and the beam pattern extends about the front of the vehicle rearward to the deck.

8. The headlight assembly of claim 1 or 7 wherein the first and second light emitting elements illuminate an area approximately 270° about the front of the tractor.

9. A headlight and sidelight assembly for an off-road vehicle which is capable of a spin turn about its rear axle and carries a vegetation cutting deck between front and rear sets of wheels, the vehicle having a front enclosure, the front enclosure having a front end face lying substantially in a plane disposed substantially perpendicular to a longitudinal axis of the vehicle and having first and second side faces, each of said first and second side faces lying substantially in a plane disposed substantially parallel to the longitudinal centerline of the vehicle, said headlight assembly comprising:

a first light housing disposed at the intersection of the end face and one of the first and second side faces and at least partially open toward a side and front of the vehicle;

a second light housing disposed at the intersection of the end face and the other of the first and second side faces and at least partially open toward a side and front of the vehicle;

a first translucent lens covering at least in part the first light housing;

a second translucent lens covering at least in part the second light housing;

a first reflector disposed within the first light housing in alignment with the first translucent lens and forming first and second divergent inner walls of the first light housing, each of the inner walls being substantially free of openings therein so as to form an unbroken surface from which light may be directed, the first wall extending towards the longitudinal centerline of the vehicle and the second wall extending away from the longitudinal centerline of the vehicle, each of the inner walls including a curved portion, the curved portion transitioning to a substantially non-curved portion;

a second reflector disposed within the second light housing in alignment with the second translucent lens and forming first and second divergent inner walls of the second light housing, each of the inner walls being substantially free of openings therein so as to form an unbroken surface from which light may be directed, the first wall extending towards the longitudinal centerline of the vehicle and the second wall extending away from the longitudinal centerline of the vehicle, each of the inner walls including a curved portion, the curved portion transitioning to a substantially non-curved portion;

a first light-emitting element disposed between the first reflector and the first translucent lens, the curved portion of the first reflector being disposed adjacent the first light-emitting element; and a second light-emitting element disposed between the second reflector and the second translucent lens, the curved portion of the second reflector being disposed adjacent the second light-emitting element;

each of said first and second light-emitting elements and associated ones of the first and second reflectors and first and second translucent lenses cooperating to establish a beam pattern of light to be projected therefrom, said beam pattern intersecting the longitudinal centerline of the vehicle and extending outward and rearward therefrom to the vegetation cutting deck.

10. The headlight assembly of claim 9 wherein the light-emitting element is directed at an angle of 45° from the longitudinal centerline of the vehicle.

11. The headlight assembly of claim 9 wherein the light-emitting element is configured as a bulb having a filament oriented generally vertically.

12. The headlight assembly of claim 9 wherein the front enclosure includes a grille portion and the first and second light housings are integrally molded in the grille portion of the front enclosure.

13. The headlight assembly of claim 12 wherein the reflector is comprised of a reflective mylar film affixed to an inner surface of the light housing.

14. The headlight assembly of claim 9 wherein at least one of the inner walls of the first and second light housings include curved portions for directing a greater amount of light toward a desired target area.

15. The headlight assembly of claim 9 wherein the first and second light emitting elements illuminate an area approximately 270° about the front of the vehicle.

16. A vehicle including a headlight assembly, the assembly comprising:

a light housing;

a light-emitting element disposed within the light housing;

a reflector disposed within the light housing and behind the light-emitting element, the reflector forming first and second divergent inner walls of the light housing, each of the inner walls being substantially free of openings therein so as to form an unbroken surface from which light may be directed, the first wall extending towards the longitudinal centerline of the vehicle and the second wall extending away from the longitudinal centerline of the vehicle, each of the inner walls including a curved portion adjacent the light-emitting element, the curved portion transitioning to a substantially non-curved portion; and each of the light-emitting element and the reflector cooperating to establish a beam pattern of light to be projected therefrom, said beam pattern intersecting the longitudinal centerline of the vehicle and extending outward and rearward therefrom past a line transverse to the longitudinal centerline of the vehicle and extending through a rearward end of the light housing, the light-emitting element effectively illuminating an area around the periphery of the vehicle.

* * * * *